UNITED STATES PATENT OFFICE.

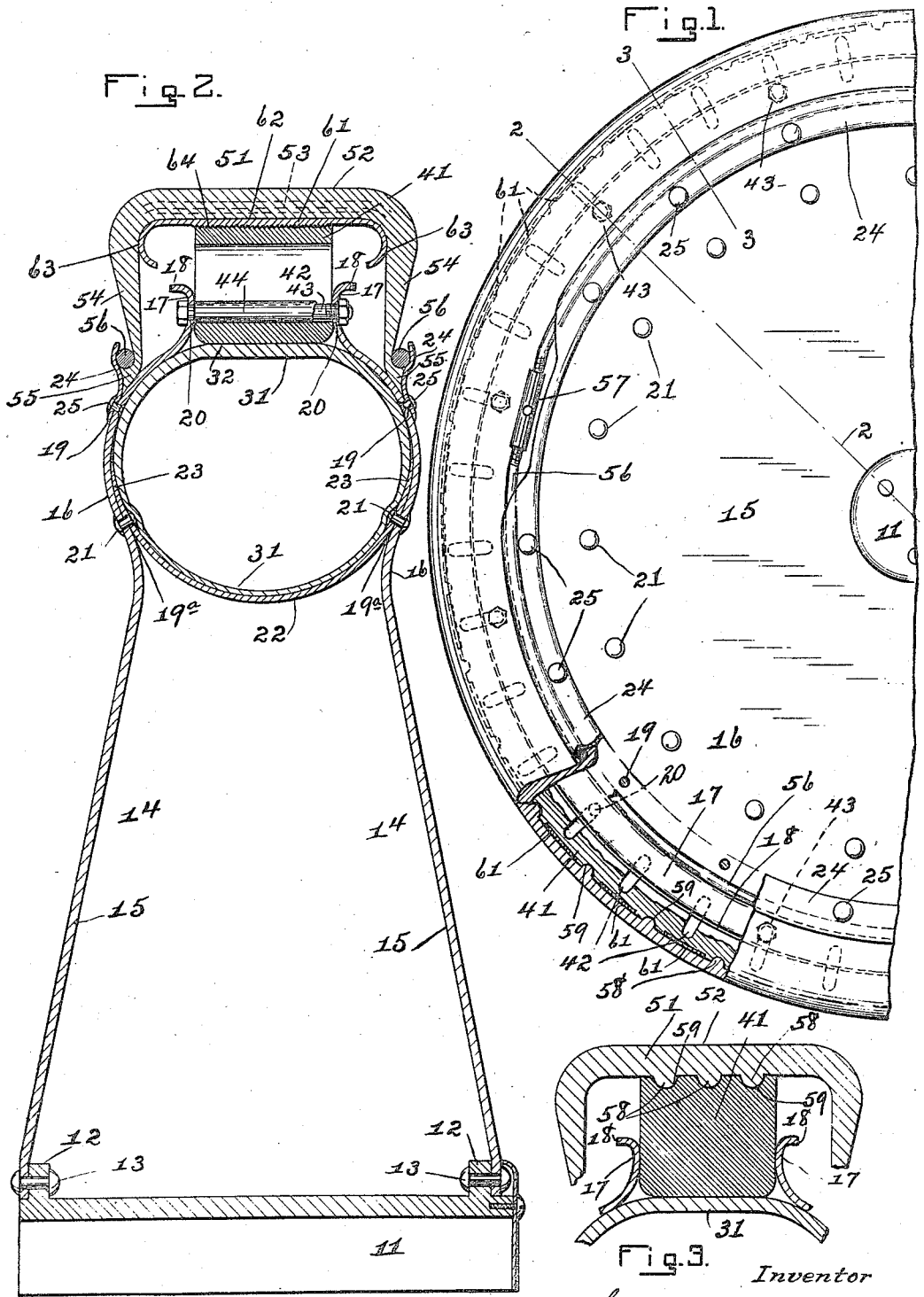

S WALTER SCOTT, OF TROY, NEW YORK.

VEHICLE-WHEEL.

1,175,382.   Specification of Letters Patent.   Patented Mar. 14, 1916.

Application filed February 3, 1915. Serial No. 5,867.

*To all whom it may concern:*

Be it known that I, S WALTER SCOTT, a citizen of the United States, residing at Troy, Rensselaer county, New York, have invented certain new and useful Improvements in Vehicle-Wheels, of which the following is a specification.

My invention relates to vehicle wheels of a resilient type.

It is intended to produce a wheel combining the advantages of a pneumatic tire in resiliency, of a solid rubber tire in non-puncturability and of a protected tire, in that it has an easily detachable and renewable tread surface, beside the advantage of great strength and durability in the wheel itself.

Further objects and details of the invention will be pointed out in the specification and specified in the claims.

In the drawings, which represent a preferred form of my device, Figure 1 is a side elevation of my wheel, partly broken away; Fig. 2 is a transverse section through the plane 2—2, Fig. 1; Fig. 3 is a partial section through the plane 3—3, Fig. 1.

11 designates a hub, which may be of any desired pattern provided that it has two annular flanges 12 pierced for rivets or bolts 13, for securing two similar, annular, sheet steel disks 14, each having a dished spoke portion 15, a convex curved portion 16, a radial portion 17, and an out-turned flange 18. In curved portion 16 are pierced two annular series of rivet or bolt holes 19 and 19ª, and in radial portion 17 one such series 20. Secured between disks 14 by rivets 21 in holes 19ª is a sheet metal annulus 22, of concave cross-section and having thinned edges 23, which fit in curved portions 16. A small annular flange 24 is secured by rivets 25 in holes 19 to each curved portion 16 of disks 14, the flanges projecting in a substantially radial direction, see Fig. 2. 31 is a pneumatic tube adapted to be seated in the approximately elliptical annulus formed by member 22 and the curved members 16 of disks 14. The tube may be of ordinary construction, but is preferably thickened or reinforced at its outer face 32. Surrounding and supported by tube 31 is a resilient annulus 41 preferably of rubber or the like, solid except for radial slots 42. This part 41 has sliding fit between radial members 17 of disks 14 and is held therebetween by bolts 43 passing through slots 42, sleeves 44 being placed on bolts 43 to space members 17 rigidly apart.

Surrounding annulus 41, hereafter designated as the tire, is a tread 51, the wearing face 52 of which may be reinforced in any way, as by strips of fabric 53 therein or otherwise, and may be "smooth tread" or otherwise. At each edge of face 52 is an inturned skirt 54, preferable of pure rubber, and having an outturned flange 55 adapted to be seated in the space between member 16 and flange 24 and to be held therein by hoops 56, shown as tightened by a turn-buckle 57. As a means of preventing creeping and particularly lateral displacement between tire 41 and tread 51, I may form the tread with inwardly projecting knobs 58, engaging in depressions 44 in tire 41, see Fig. 3. I preferably interpose between tire 41 and tread 51 an intermittent series of thin metal plates 61, having a straight body portion 62 shaped to the arc of the outer face of tire 41 and approximately semi-circular ends 63, the space between which is greater than that between the outer edges of flanges 18. These transverse plates are of course placed between the series of knobs 58, and may themselves be corrugated as at 64, on their inner faces to bite into the face of tire 41 and prevent relative movement, see Fig. 2.

It is obvious that many mechanical changes may be made in the device without departing from my invention. Among the many advantages of my wheel and tire are these: great strength and durability, rendering it quite unnecessary to carry a spare wheel or tire and adapting them to the heaviest trucks; absolute protection of the air tube from puncture or blowing out; entire protection from dust, mud or water; an unusually wide tread; easy and rapid detachment of the tread, the only part that receives wear; prevention of wear or other injury by "creeping"; in the rare case of accidental deflation the ability to travel for some distance without injury to the tire by reason of plates 61 coming down on to flanges 18 and preventing further depression; and the saving of wear on slots 42 in tire 41 by providing several slots, three as shown, for each bolt 43.

I have deemed it unnecessary to describe the operation of the device, as this will be apparent from a mere inspection of the drawings, it being understood that the skirt 54 buckles as tread 51 is depressed, and if inward always against curved surfaces 16 and 63.

It will be noted that the flanges 55 of the side skirt portions 54 of tread 51 fit closely into the space between curved portions 16 of side plates 14 and flanges 24; and that these resilient skirt members are held in air-tight contact with members 16. In this way hub 11, sides 14 and tire 51 together form an absolutely dust- mud- oil- and water-tight receptacle for tube 31 and tire 41, whereby all these foreign substances, which tend to wear and rot both tube and tire are positively excluded. It will also be understood that air-tube 31 is sufficiently thickened or otherwise stiffened in any desired manner at its outer face 32 to prevent its being forced by the air pressure between tire 41 and flanges 17, so as to be torn or strained by the inward movement of the tire.

What I claim is:

1. A vehicle wheel including metal parts constructed substantially as described and so as to provide a non-angular seating, open only at its outer side, for a pneumatic tube, and flanges extending radially at each side of such opening and each pierced with an annular series of bolt holes; a pneumatic tube in said seating; a tire having a sliding fit between said flanges and formed with a series of similar transverse, radial slots, the width of said slots being substantially equal to the diameter of said bolt holes, the number of said slots being a multiple of the number of said bolt holes; and bolts passing through said bolt holes and through certain of said slots, substantially for the purposes set forth.

2. A vehicle wheel including metal parts constructed substantially as described and so as to provide a non-angular, annular seating, open only at its outer side, for a pneumatic tube and flanges extending radially at each side of such opening and each pierced with an annular series of bolt holes; an annular, resilient tire having a sliding fit between said flanges so as to have a limited movement into and out of said seating and formed with a series of transverse, radial slots; bolts passing through said bolt holes and said slots; a tread surrounding said tire and having flexible side skirts extending to and closely secured against the outer side of said tube seating; and an intermittent series of separated transversely disposed metal plates interposed between said tire and said tread, substantially for the purposes set forth.

S WALTER SCOTT.

Witnesses:
GEO. L. COOPER,
WM. W. MORRILL.